US011991052B2

(12) United States Patent
Bamgboye et al.

(10) Patent No.: US 11,991,052 B2
(45) Date of Patent: May 21, 2024

(54) GROUND COMBAT VEHICLE COMMUNICATION SYSTEM

(71) Applicant: GOVERNMENT OF THE UNITED STATES, AS REPRESENTED BY THE SECRETARY OF THE ARMY, Washington, DC (US)

(72) Inventors: Olatunde O. Bamgboye, Clinton Township, MI (US); Eric Bennett, Rochester Hills, MI (US)

(73) Assignee: GOVERNMENT OF THE UNITED STATES, AS REPRESENTED BY THE SECRETARY OF THE ARMY, Washington, DC (US)

( * ) Notice: Subject to any disclaimer, the term of this patent is extended or adjusted under 35 U.S.C. 154(b) by 0 days.

(21) Appl. No.: 18/164,672

(22) Filed: Feb. 6, 2023

(65) Prior Publication Data

US 2023/0379226 A1    Nov. 23, 2023

Related U.S. Application Data

(62) Division of application No. 16/582,988, filed on Sep. 25, 2019, now Pat. No. 11,575,585.

(51) Int. Cl.
| | |
|---|---|
| *H04L 41/22* | (2022.01) |
| *H04L 65/60* | (2022.01) |
| *H04L 67/12* | (2022.01) |
| *H04L 69/326* | (2022.01) |
| *H04W 4/10* | (2009.01) |

(52) U.S. Cl.
CPC .............. *H04L 41/22* (2013.01); *H04L 65/60* (2013.01); *H04L 67/12* (2013.01); *H04L 69/326* (2013.01); *H04W 4/10* (2013.01)

(58) Field of Classification Search
CPC ......... H04L 41/22; H04L 65/60; H04L 67/12; H04L 69/326; H04W 4/10
See application file for complete search history.

(56) References Cited

U.S. PATENT DOCUMENTS 9,942,739 B2 * 4/2018 Bozik .................... H04W 76/19
10,234,538 B1 * 3/2019 Fortney ..................... G01S 5/02
(Continued)

*Primary Examiner* — Ninos Donabed

(57) ABSTRACT

A communication system provides multimedia communications within and between armored ground combat vehicles (GCVs). The system includes client computers within the armored GCVs providing distributed and interconnected multimedia communications among the client computers. The multimedia communication may include a one-to-one communication, a text communication to a group, an audio communication to a group, or a video communication to a group. Logic providing the distributed and interconnected multimedia communications is not located at a single client computer. The client computers display graphical user interfaces (GUIs) enabling soldiers to select parameters of the communication system with some GUIs providing presence discovery among the armored GCVs. One of the plurality of client computers acts as an origination station and other client computers may be configured as receiving communication station(s). The origination communication station may transmit digital communication data to the receiving communication station(s).

18 Claims, 18 Drawing Sheets

(56) References Cited

U.S. PATENT DOCUMENTS

| | | | |
|---|---|---|---|
| 11,575,585 B2* | 2/2023 | Bamgboye | H04L 41/22 |
| 2002/0002039 A1* | 1/2002 | Qureshey | G06F 16/686 |
| | | | 455/188.1 |
| 2004/0018838 A1* | 1/2004 | Chang | G08B 25/016 |
| | | | 455/434 |
| 2004/0070227 A1* | 4/2004 | Pape | B60P 3/341 |
| | | | 296/25 |
| 2004/0090950 A1* | 5/2004 | Lauber | H04Q 9/00 |
| | | | 370/352 |
| 2006/0062363 A1* | 3/2006 | Albrett | H04N 21/4532 |
| | | | 348/E7.071 |
| 2006/0067302 A1* | 3/2006 | Wengrovitz | H04M 1/2535 |
| | | | 370/352 |
| 2006/0123053 A1* | 6/2006 | Scannell, Jr. | G06F 16/9577 |
| 2008/0226061 A1* | 9/2008 | Marash | H04M 1/6033 |
| | | | 379/420.02 |
| 2011/0145053 A1* | 6/2011 | Hashim-Waris | G16H 80/00 |
| | | | 705/26.1 |
| 2012/0032876 A1* | 2/2012 | Tabe | H01Q 1/245 |
| | | | 455/571 |
| 2012/0254362 A1* | 10/2012 | Li | H04L 67/51 |
| | | | 709/218 |
| 2014/0313998 A1* | 10/2014 | Sorescu | H04M 7/0057 |
| | | | 370/329 |
| 2014/0368601 A1* | 12/2014 | deCharms | H04N 7/148 |
| | | | 348/14.02 |
| 2015/0215749 A1* | 7/2015 | Teetzel | H04W 4/10 |
| | | | 455/518 |
| 2016/0088455 A1* | 3/2016 | Bozik | H04W 4/02 |
| | | | 370/259 |
| 2017/0164175 A1* | 6/2017 | Bozik | H04L 51/04 |
| 2017/0310936 A1* | 10/2017 | Nordin | G06F 3/1446 |
| 2019/0126775 A1* | 5/2019 | Han | B60L 3/12 |
| 2019/0174288 A1* | 6/2019 | Bozik | H04M 7/006 |

* cited by examiner

```
         INITIATOR                  NAT                 RESPONDER
             |                       |                       |
             |                       | STUN Binding Request  |
             |                       | from 192.0.2.1:3478   |
             |                       | to   10.0.1.1:8998    |
             |                       |    (dropped)          |
             |                       |x======================|
             |                       |                       |
             | STUN Binding Request  |                       |
             | from 10.0.1.1:8998    |                       |
             | to   192.0.2.1:3478   |                       |
             | USE-CANDIDATE         |                       |
             |======================>|                       |
             |                       | STUN Binding Request  |
             |                       | from 192.0.2.3:45664  |
             |                       | to   192.0.2.1:3478   |
             |                       | USE-CANDIDATE         |
             |                       |======================>|
             |                       | STUN Binding Response |
             |                       | from 192.0.2.1:3478   |
             |                       | to   192.0.2.3:45664  |
             |                       |<======================|
             | STUN Binding Response |                       |
             | from 192.0.2.1:3478   |                       |
             | to   10.0.1.1:8998    |                       |
             | map  192.0.2.3:45664  |                       |
             |<======================|                       |
             |                       |                       |
             |<==Media Now Can Flow==|                       |
             |                       |                       |
             |                       | STUN Binding Request  |
             |                       | from 192.0.2.1:3478   |
             |                       | to   192.0.2.3:45664  |
             |                       |<======================|
             | STUN Binding Request  |                       |
             | from 192.0.2.1:3478   |                       |
             | to   10.0.1.1:8998    |                       |
             |<======================|                       |
             | STUN Binding Response |                       |
             | from 10.0.1.1:8998    |                       |
             | to   192.0.2.1:3478   |                       |
             | map  192.0.2.1:3478   |                       |
             |======================>|                       |
             |                       | STUN Binding Response |
             |                       | from 192.0.2.3:45664  |
             |                       | to   192.0.2.1:3478   |
             |                       | map  192.0.2.1:3478   |
             |                       |======================>|
             |                       |                       |
             |                       |==Media Now Can Flow==>|
             |                       |                       |
```

Fig. 15

▼ 📂 Libraries
- ▶ ☐ Jcdp-1.25-10-nix.jar
- ▶ ☐ bccontrib-10.SNAPSHOT.jar
- ▶ ☐ bcprov-jdk15on-148.jar
- ▶ ☐ cpptasks.jar
- ▶ ☐ dnsjava.jar
- ▶ ☐ felix.jar
- ▶ ☐ fmj.jar
- ▶ ☐ sson-simple-1.1.1.jar
- ▶ ☐ jspeex.jar
- ▶ ☐ osgi.core.jar
- ▶ ☐ peerbase-java.jar
- ▶ ☐ sdes4j-1.1.1.jar
- ▶ ☐ slf4j0api-1.7.5-sources.jar
- ▶ ☐ slfj-api-1.7.5.jar
- ▶ ☐ slf4j-simple-1.7.5.jar
- ▶ ☐ smackx-debug.jar
- ▶ ☐ smackx-jingle.jar
- ▶ ☐ zrtp4j-light.jar
- ▶ ☐ smackx.jar
- ▶ ☐ Absolute Layout -AbsoluteLayout.jar
- ▶ ☐ Beans Binding – beansbinding.jar
- ▶ ☐ selenium-htmal=runner-e.4.0.jar
- ▶ ☐ smack.jar
- ▶ ☐ commons-lang-2.5.jar
- ▶ ☐ Ice4j-1.0.0.jar
- ▶ ☐ libjitsi.jar
- ▶ ☐ Kotlin-runtime.jar

Fig. 17

GROUND COMBAT VEHICLE COMMUNICATION SYSTEM

CROSS-REFERENCE TO RELATED APPLICATIONS

This application is a division of co-pending U.S. patent application Ser. No. 16/582,988, filed on Sep. 25, 2019 by at least one common inventor and entitled "Ground Combat Vehicle Communication System", which is incorporated by reference herein in its entirety.

GOVERNMENT INTEREST

The inventions described herein may be made, used, or licensed by or for the U.S. Government. The U.S. Government has rights in the inventions.

TECHNICAL FIELD

A system that provides inter-connected communications for ground combat vehicles. The system includes communications within a ground combat vehicle and between ground combat vehicles. In particular, the invention relates generally to a customized and simplified graphical user interface GUI frontend that is able to originate and utilize different protocols for bi-directional communications to provide multimedia communication platforms to ground combat vehicles. It is also able to be integrated with certain commercial hardware devices as end points for communication when desired.

BACKGROUND

Ground combat vehicles (GCVs) have traditionally used analog communications systems such as the vehicular intercom system-5 (VIC-5) communication system. The VIC-5 system has stations in various locations within a GCV for receiving and transmitting communications within a vehicle. Newer VIC-5 systems provide for inter-vehicle communication in a similar manner. These systems are may be "push-to-talk", "voice-activated" and/or "open-microphone" systems that broadcast communications to anyone that has selected/turned on their VIC-5 station to receive and transmit communications into and from the system. Thus, these systems allow anyone with a VIC-5 station to listen to communications occurring over the communication system. What is needed is a better communication system within and between GCVs.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One example is a communication system for providing multimedia communications within and between armored ground combat vehicles (GCVs). The communication system includes client computers within the armored GCVs configured to provide distributed and interconnected multimedia communications among the client computers where the communication system is compatible with armored GCV environments. Logic providing the distributed and interconnected multimedia communications is not located at a single client computer. The multimedia communication may be a one-to-one communication, a text communication to a group, audio communication to a group or video communication to a group.

Displays are connected to the client computers for displaying at least a one graphical user interface (GUI) for enabling a soldier to select one or more parameters of the communication system. Then at least one GUI is configured to provide for presence discovery among the armored GCVs. For example, the GUI may provide a listing of available communication stations within the armored GCVs that are available for communications. When in use, one of the plurality of client computers is configured to act as an origination communication station and at least one of the plurality of client computers is configured to act as at least one receiving communication station. The origination communication station is configured to transmit digital communication data to the least one receiving communication station.

In some configurations, the digital communication data is transmitted as at least one packet of digital data. Then at least one packet of digital data may comprise at least one Internet Protocol (IP) version 4 (IPv4) packet of data. The plurality of client computers may also be configured to route the at least one packet of digital data based on IPv4 addressing protocols. In an additional configuration, the communication system is configured to communicate using datagrams and/or packets.

Some configurations of the communication system may include application program interfaces (APIs)/GUIs associated with one or more of client computers and at least some of client computers may use extensible messaging and presence protocol (XMPP) for interfacing with other client computers. Java software may at least partially implement XMPP running on at least one of the plurality of client computers. The armored GCVs may be one or more of: an Abrams tank, a Bradley fighting vehicle, a Stryker vehicle, an armored personnel carrier, a high mobility multipurpose wheeled vehicle (Humvee), a light armored vehicle (LAV), a combat support vehicle, a mine-protected vehicle, a utility vehicle, and a Mine Resistant Ambush Protected (MRAP).

Another configuration includes a communication system within an armored ground combat vehicle (GCV) including a former analog station, a first computer, a server, and PBX software (SW). The former analog station within the GCV was formerly a push-to-talk analog station. The first computer has a display operatively connected digitally to the former analog station. The first computer is configured to display a selection graphical user interface (GUI) on the display. The selection GUI is configured to receive a selected station that a crew-member has selected to communicate. The first computer is configured to display a communication GUI on the display to accept digital communication data for transmission to the selected station via the use of an open source technology PBX. The server is operatively connected to the first computer and is configured to receive the digital communication data. The PBX software (SW) is running on the server and is configured to switch and route the digital communication data to the selected station for reception.

The communication system may have other useful configurations and features. For example, the first computer may be configured to display a keypad GUI on the display allowing the crew-member to key in a number associated with the selected station. In yet other configurations, the selection GUI further has a station list GUI that automatically lists available stations that are available for communication. The communication system may transmit the digital communication data using VoIP data packets. The former analog station may be a vehicular intercom system-5 (VIC-5) station. In some embodiments, the first computer is a 672 Digital Beachhead computer and operating system and the PBX SW may be Asterisk PBX SW server.

Another example is a method of communicating over a communication system among a plurality of client computer in armored ground combat vehicles (GCVs). The method provides distributed and interconnected communications among the plurality of client computers, wherein logic providing the distributed and interconnected communications is not located at a single client computer. The method also employs presence discovery among the armored GCVs via graphical user interfaces (GUIs). The communication data is transmitted in digital packets from an originating communication station to at least one receiving communication station. The transmitting may include transmitting the communication data from a first armored ground combat vehicle (GCV) to a second different GCV. The communication data is transmitted to at least one of the groups consisting of: a one-to-one communication, a text communication to a group, an audio communication to a group, and a video communication to a group.

The following description and the annexed drawings set forth in detail certain illustrative aspects of the subject matter. However, these aspects are indicative of some of the numerous ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

FIG. 15 illustrates another example embodiment of a XEP-0176 Jingle ICE-UDP diagram protocol description transport method.

FIG. 17 illustrates example open source libraries and licenses such as the Apache License 2.0.

DETAILED DESCRIPTION

In general, some configurations of the invention provides multiple communication channels for ground combat vehicles (GCVs) that might employ interconnected audio conferencing, chat conferencing, and/or video conferencing. Software implementations of various features of the ground combat vehicle (GCV) communication system(s) may consist of custom built and developed application program interface (APIs) and graphical user interface(s) (GUIs) that have standard interface requirements compatibility for mission capabilities and ease of operation for crew stations and members. Such implementation may allow a Digital Beach Head (DBH) operating system act as a server medium. In some configurations, the architecture may also be integrated with a legacy vehicular intercom system-5 (VIC-5), Enhanced VIC-5 (AN/VIC-5), and similar systems and their interfaces.

In one embodiment, the concept implemented is a customized Extensible Messaging and Presence Protocol (XMPP)/Jingle framework GUI for media transmission . . . . Another embodiment is able utilize protocols compatible commercial external hardware such as Session Initiation Protocol (SIP) VoIP as end points for bi-directional communication, an actual instance being the existing VIC-5 systems to originate VoIP calls within/between ground combat vehicles.

Figure 1:
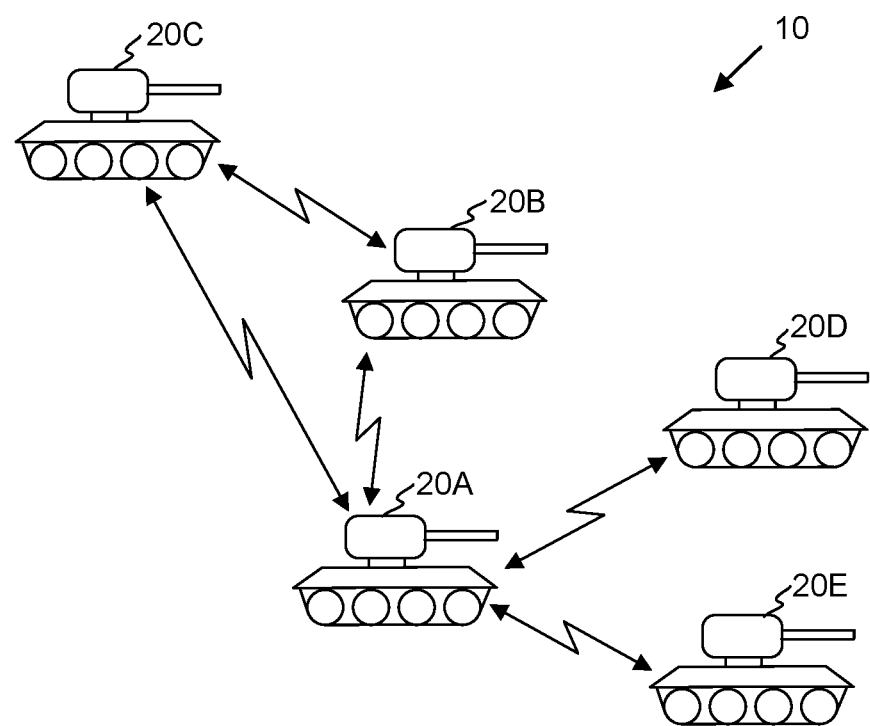
FIG. 1 illustrates an example diagram of how ground combat vehicles (GCVs) may communicate using an example wireless network.

FIG. 1 illustrates an example diagram of how some ground combat vehicles (GCVs) may communicate using various wireless networks. Those of ordinary skill in the art will appreciate that any or any combination of a variety of wireless systems may be used to allow inter-communications to be implemented between two or more of the GCVs. Wireless ad hoc networks may be employed as wireless mesh networks or mobile ad hoc networks (MANETs), or in other ways so that network nodes forward messages on behalf of the other nodes.

In the example illustration in FIG. 1, an inter-GCV communication system 10 is implemented so that GCV 20A may wirelessly communicate with GCVs 20B-E. However, if GCV 20B or GCV 20C desire to communicate with GCV 20D or GCV 20E, then their communication can pass through any other GCVs. The GCVs 20A-E may be any combination of vehicles such as Abrams or other tanks, Bradley fighting vehicles, personnel transports and/or any other combination of GCVs.

Figure 2:
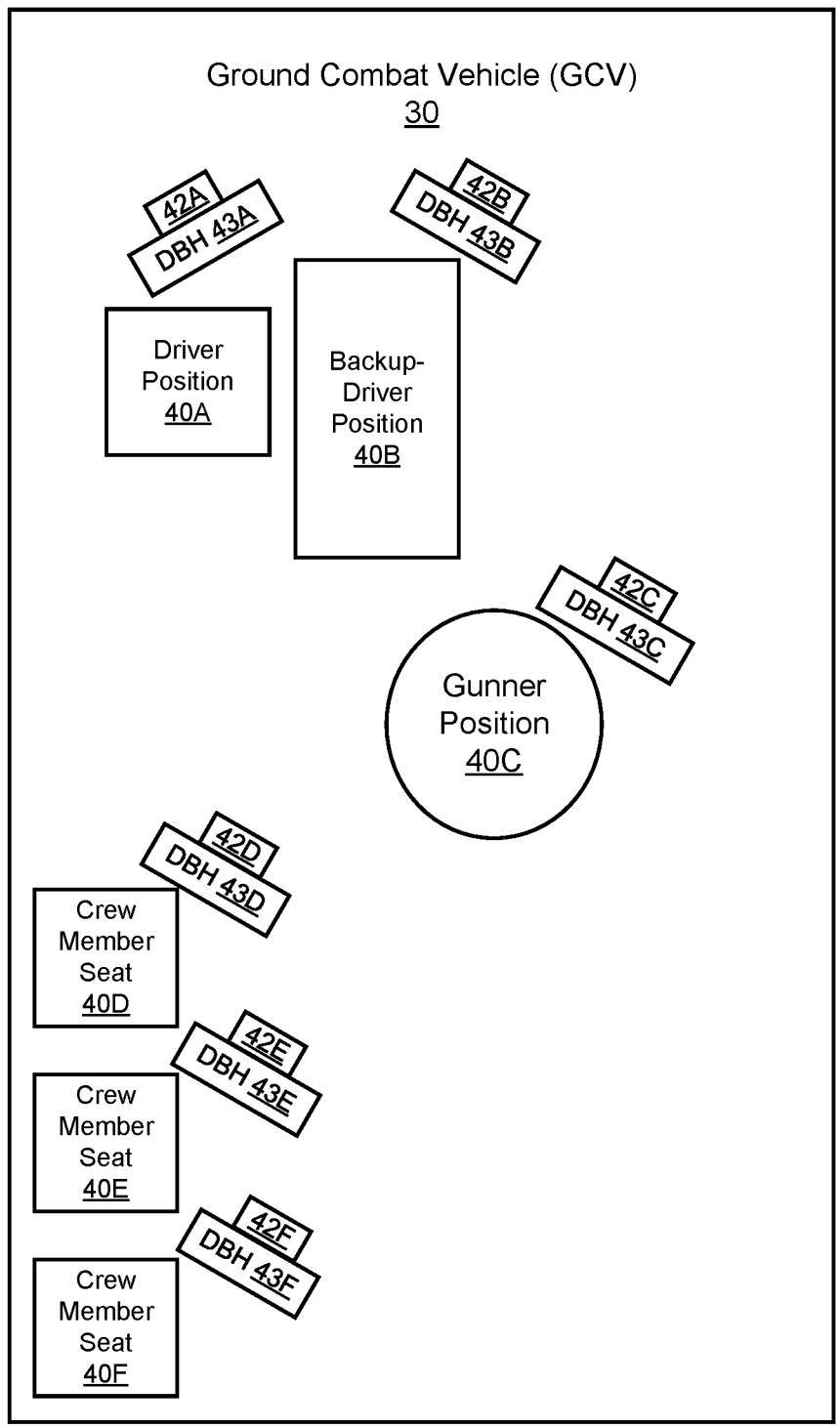
FIG. 2 illustrates one example configuration of a schematic of some components of a communication system within a GCV.

FIG. 2 illustrates one configuration of a schematic of some components of a communication system with within a GCV 30. This example configuration includes a driver position 40A, a backup driver position 40B, a gunner position 40C and crew-member seats (positions) 40D-F. In this example figure, each position 40A-F is associated with a Digital Beachhead (DBH) 43A-F type of computer and a display 42A-F. The displays 42A-F are used to display graphical user interfaces (GUIs) to allow a solder/crew-member in each position 40A-F to view communication related text, graphical content, video content, and to transmit and/or receive audio messages. The displays 42A-F may include headphones and/or speakers for generating and/or receiving audio content. For illustration purposes, each position 40A-F is illustrated as being associated with a display 42A-F. In some alternative configurations, positions 40A-F may contain legacy analog VIC-5 devices that may be tactical control councils (TCCs), full functional crew stations (FFCSs), or other VIC devices, as desired.

Figure 3:
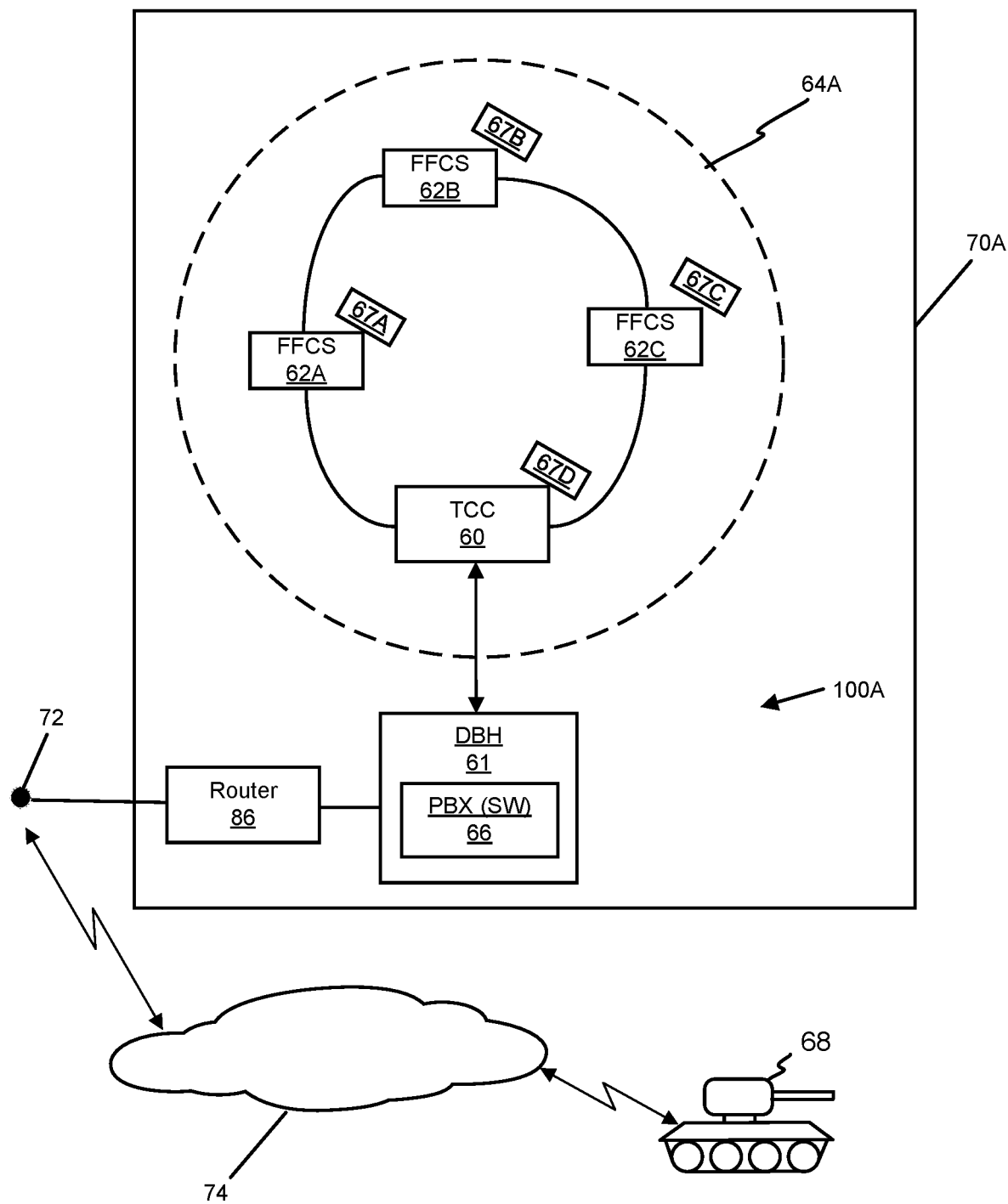
FIG. 3 illustrates an example environment implementing a "Client Variant A" version ("Variant A") of a communication system.
Figure 4:
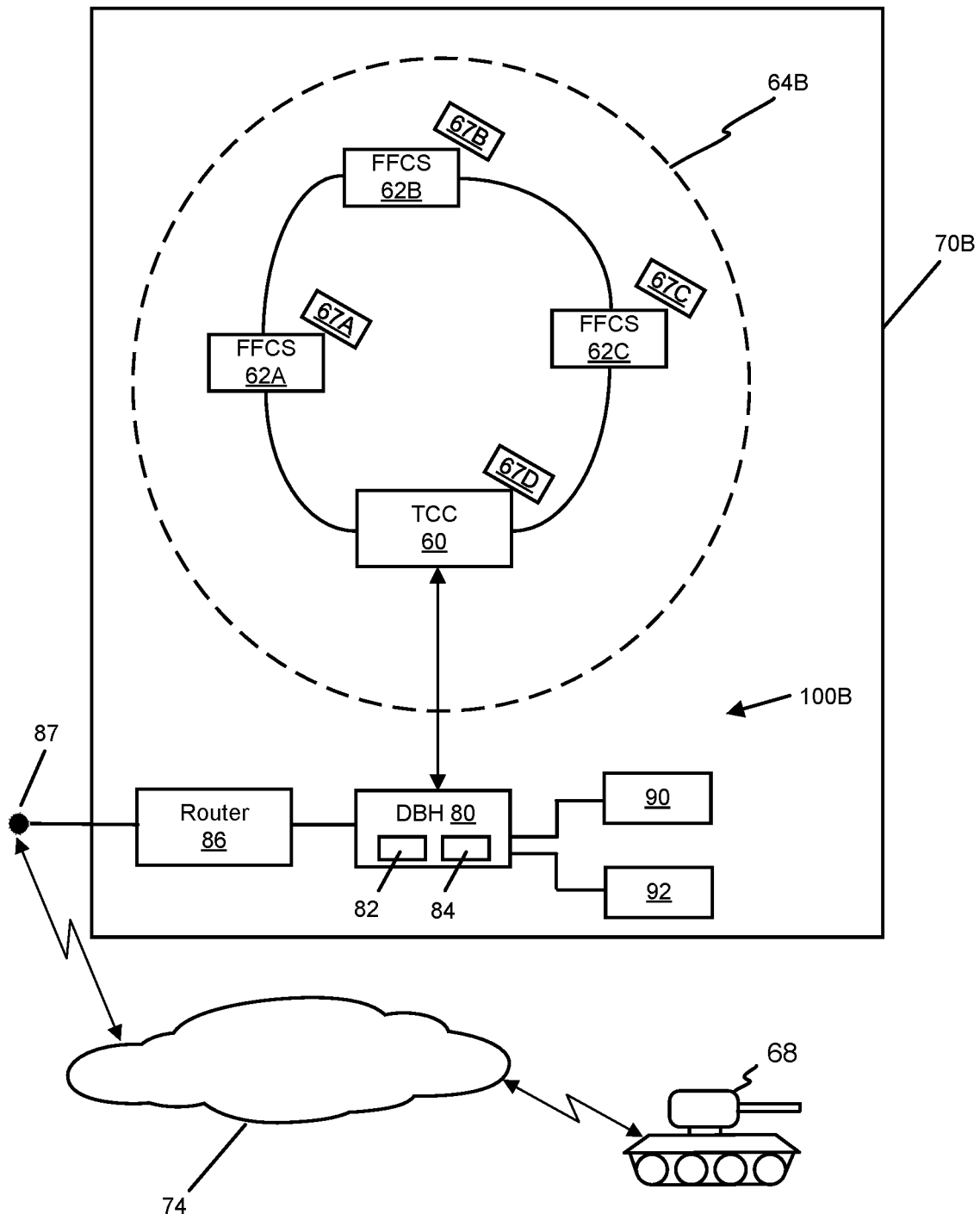
FIG. 4 illustrates an example environment implementing a "Client Variant B" version ("Variant B") of a communication system.

FIGS. 3 and 4 illustrate the schematic implementation of two versions of differing communication systems 100A, 100B within ground combat vehicles (GCVs) 70A-B that utilize legacy VIC-5 systems 64A-B. FIG. 3 illustrates the environment implementing a first version "Variant A", "Client A", or "Client Variant A". FIG. 4 illustrates an environment implementing a second version "Variant B", "Client B", or "Client Variant B". Each of these two communication systems 100A-B utilizes digital communications onto prior analog existing VIC-5 systems 64A-B in two different ways, as discussed further below, using Client Version A in the first system 100A and using Client Version B in the second system 100B. In some configurations, the VIC-5 systems 64A-B in the GCVs 70A-B of FIGS. 3 and 4 may be similar or the same. Additionally, each VIC-5 system 64A-B is shown with a single VIC-5 tactical control council (TCC) 60 and three VIC-5 full functional crew stations (FFCS) 62A-C. However, other embodiments may have additional TCCs and or a different number of FFCSs as understood by those of ordinary skill in the art.

Client Variant A is capable of remoting external hardware communication systems 64A according to the software PBX defined communication protocols employed which in this specific case for the invention the VIC-5 is configured for SIP which is providing the VoIP. The first variant (Client Variant A) works by exposing a Graphical User Interface (GUI) that is similar to that of a soft phone API. In this variant, a crew-member can easily key in the desired VIC-5 extension number the crew-member wishes to communicate with and behind the scenes Client Variant A 61 acts as a virtual manager to connect both extensions for a "basic VoIP" call session using the VIC-5 hardware at both endpoints of the call similar to using standard phones. Thus, Client Variant A emulates how a traditional phone service provider bridges soft protocols and Session Description Protocol (SDP) sessions to create a point-to-point bi-directional call.

Client Variant B eliminates the need for PBX SW and, instead, utilizes a computer 80 running a DBH type of operating system, at least in part, as a multimedia server. Variant B also employs the Extensible Messaging and Presence Protocol (XMPP) client functionality to exchange real time messages, and, in some embodiments, Jingle which is an extension of XMPP that adds additional multimedia communications which includes (VoIP) and videoconferencing to meet the interface description requirements and a mode of operation desired for the GCVs (Ground Combat Vehicles). By exposing a different set of GUI, in contrast to Variant A, this API allows click to connect and login functionality by a crew-member according to the configured hostnames and internet protocol (IP) address assigned to each crew-member station. Using XMPP with its Jingle-ICE/UDP extension allows the implementation of address subgroups to provide multiple crew-members to connect together in different combinations of multi-user communications for VoIP. Hence, Client Variant B enables one-to-one private messages, multi-user chat, audio/video conferencing, and the like.

In Client Variant A, the VIC-5 system has its own headset pair (discussed below) that comes with, in general, each type of VIC-5 console (TCC/DEOS/EOS) and may plug directly into each of these consoles. In contrast, Client Variant B systems, utilize XMPP with headsets directly connected to the DBH-672/operating system or corresponding Client computer via a USB cable or Bluetooth link. In general, the VIC-5 system communication portion of Variant A and the XMPP communication portion Variant B are distinct from each other and may be thought of as separate types of implementations. In the embodiments discussed below they both may just happen to be controlled from a single "main window" GUI> However, Client Variant A and Client Variant B have multiple but yet independent interfaces for each of these two variants.

In more detail, the communication system 100A of FIG. 3 includes a computer/server 61 that may be a Digital Beachhead (DBH) type of computer/operating system running private branch exchange (PBX) phone system software (SW) 66. For example, the PBX SW 66 may be Asterisks SW acting as the server and running on a 672 Digital Beachhead or similar platform. In general, in Client Variant A the DBH 61 and PBX SW 66 establish SIP endpoints to and from the TCC 60 via router 86 and the antenna 72 for communicating external to the GCV 70A and uses Ethernet for end-to-end points for internal communication within the GCV 70A. A SIP session is originated from the VIC-5 system of the crew-member station client computer GUI and, if necessary, then onto the desired extension (VIC-5 system) that was intended to be reached as keyed in by the user.

Client Variant B, different from Client Variant A, is implemented in FIG. 4 of the second variant of a communication system 100B that also includes a computer/server 80 that may be a digital beachhead type of computer/operating system together with a router 86. The computer/server 80 may be a 672 Digital Beachhead which includes a switch component 82 as well a processing component 84. Some configurations may include a microphone (MIC) 90 and a headset 92 connected to the computer 80 to generate and/or listen to audio communications.

Communications implemented in the Client Variant B are digital and packets are based XMPP that can utilize IPv4 routing/networking. XMPP/Jingle creates source and destination addresses for packet exchange, as understood by those of ordinary skill in the art. For example, referring back to FIG. 2, the driver in the driver position 40A of GCV 30 may create a message through display/GUI 42A to be sent directly to the GUI 42C in the gunner position 40C of the same GCV 30. Alternatively, the driver in the driver position 40A of GCV 20A (FIG. 1) may create a message through display/GUI 42A to be sent directly to the GUI 42C in the gunner position 40C of GCV 20E (FIG. 1). IPv4 may also be used to create an IP addressing group. The group can be used to send a message from the GUI/display 42C of gunner position 40C of the GCV 30 of FIG. 2, to the three crew-member displays/GUIs 42D-F at the crew-member seats 40D-F of the same GCV 30. Alternatively, IP addressing may be used to create an IP addressing group to send a message, for example, sent from the GUI/display gunner position of the GCV 20A of FIG. 1, to the GUI/displays at gunner positions in GCV 20D and GCV 20E. Of course, IPv4 groups, subgroups, and other features of IPv4 may also be used as understood by those of ordinary skill in the art.

Figure 5:
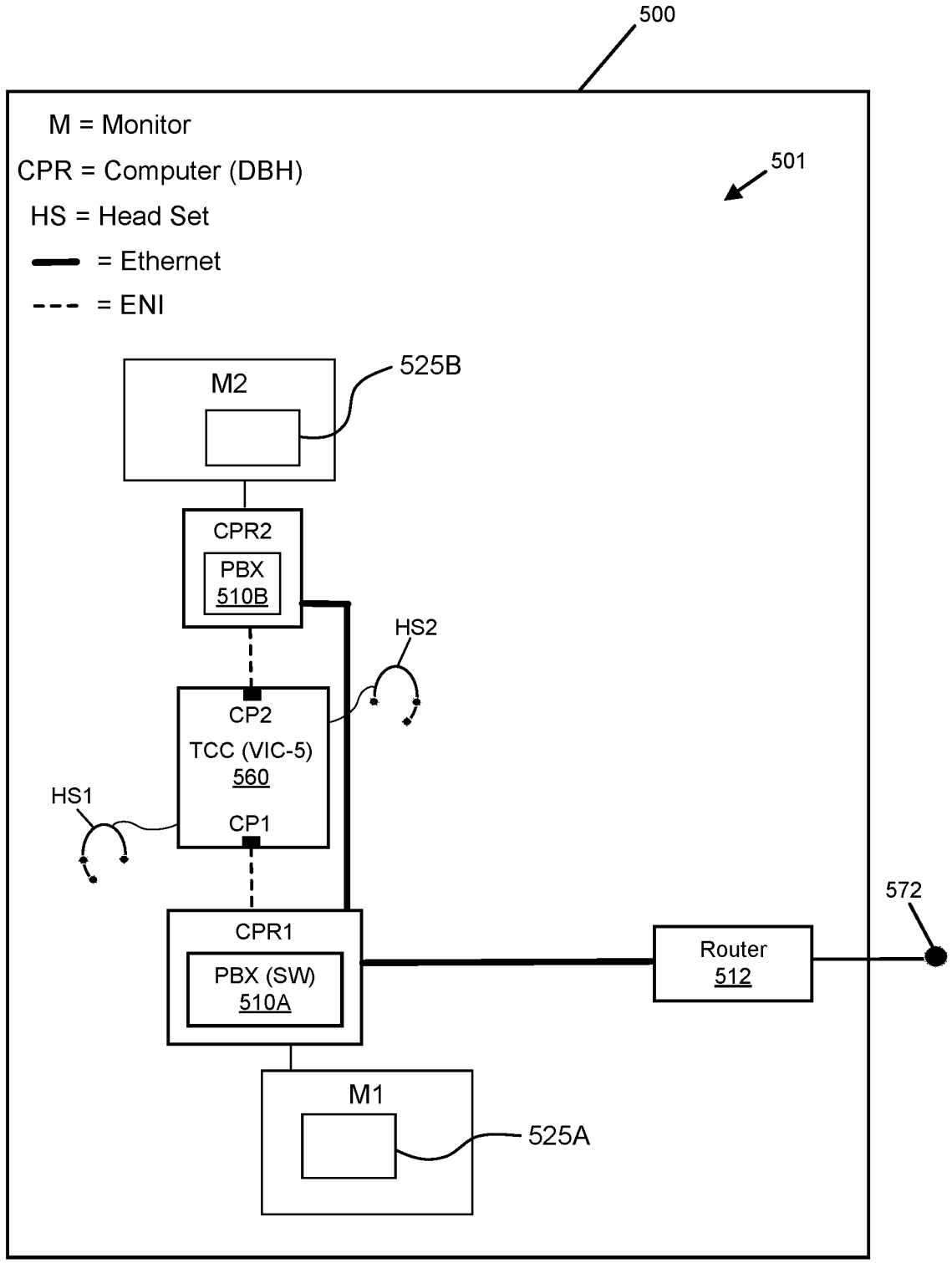
FIG. 5 illustrates a second example environment implementing "Client Variant A".

FIG. 5 illustrates another example embodiment of a communication system 501 inside a GCV 500 that implements Client Variant A. The communication system 501 operates with portions of a legacy VIC-5 system that includes a TCC 560 with connections for two crew-member communication devices CR1, CR2. A first computer CPR1 is connected to the first crew-member port CP1 with an Ethernet Network Interface (ENI) cable and a second computer CPR2 is connected to the second port CP2 with another ENI cable, as illustrated. The first computer CPR1 is running PBX SW 510A enabling the routing of communication data. If CPR2 is to also originate and place calls, in some embodiments, the underlying assumption is for CPR2 to also run the PBX SW 510B that would facilitate this ability. The first and second computers CPR1, CPR2 are each connected to a monitor M1, M2, respectively, and each monitor may display at least one graphical user interface (GUI) 525A, 525B. The GUIs may be used by crew-members at each of these two stations to select other crew-members to communicate with and enable communications with other crew-members as discussed further below. The first and second computers CPR1, CPR2 are also each connected to headsets HS1, HS2 via ports of the VIC-5 system. Each headset HS1, HS2 has audio ear speakers and a microphone (MIC) for listening to audio communication and generating audio communications.

The first computer CPR1 is connected to a router 512 with an Ethernet cable. The router 512 routes messages to destination addresses as understood by those of ordinary skill in the art and may route messages out of antenna 572 to other GCVs or from other GCVs into the illustrated GCV 500. For one vehicle 500, one switch 510A may connect all the individual stations to a single router 512 that carries all the packets outside of the vehicle 500. When the switch 510A is connected to a router 512, other clients computers connected to that switch 510A would have access to the router's gateway to the outside link. If CPR2 is to also originate and place calls, CPR2 may also run a version of the PBX SW 510B to facilitate this ability.

Figure 6:
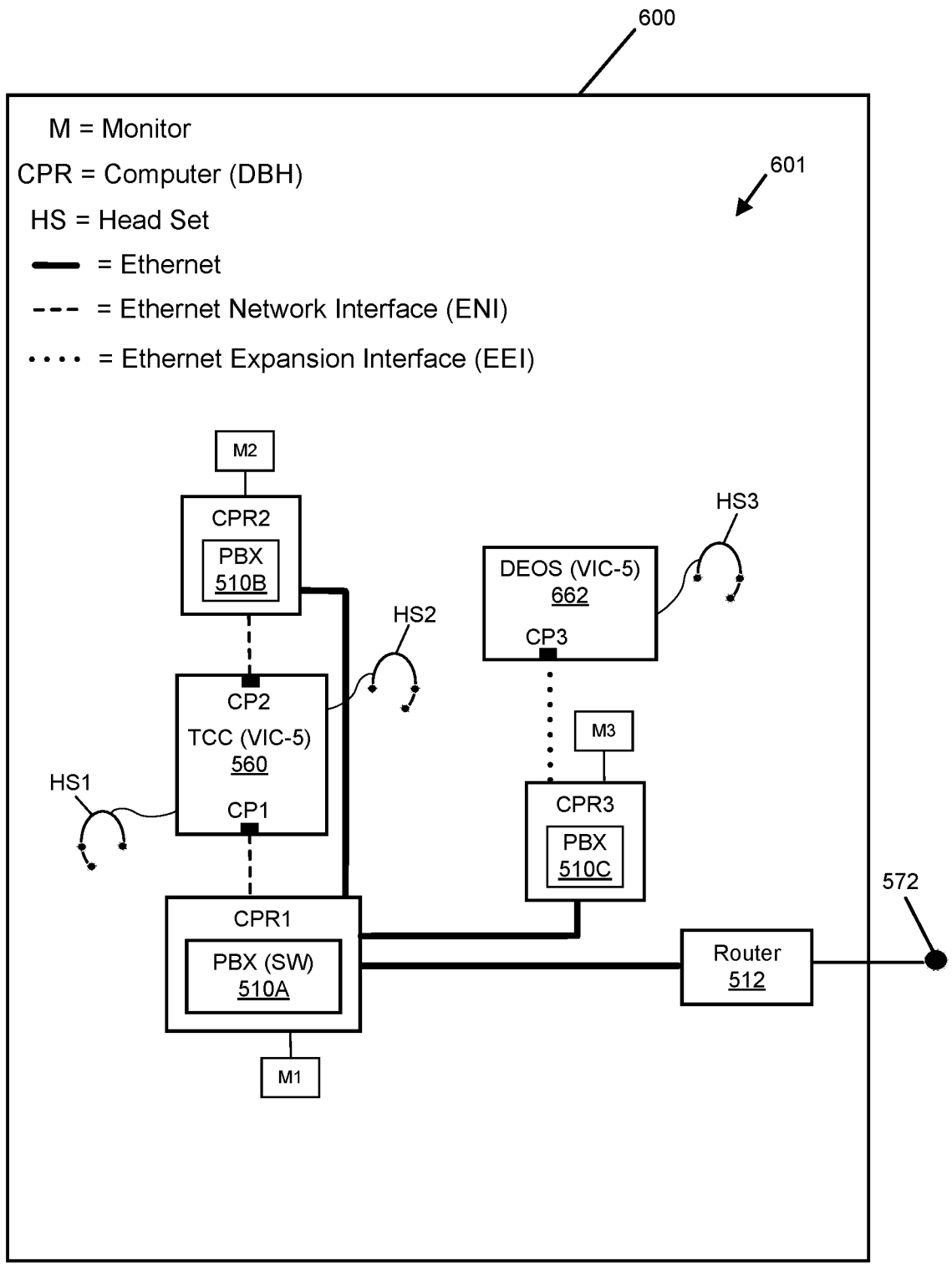
FIG. 6 illustrates a third example environment implementing "Client Variant A".

FIG. 6 illustrates another embodiment of a Client Variant A communication system 601 inside a GCV 600 similar to the communication system 501 inside GCV 500. The similar communication system 601 includes first and second computers CPR1, CPR2, similar to FIG. 5, both with headsets HS1, HS2, and monitors M1, M2. These computers CPR1, CPR2 are connected to a TCC 560 as before and the first computer CPR1 implements a software switch 510A that acts as a "master" switch. The router 512 and switch 510A are also connected to an antenna 572 for inter-vehicle communication. FIG. 6 has a third computer/operating system CPR3 connected to a VIC-5 Dual Enhanced Operating Station (DEOS) 662 with an Ethernet Enhanced Interface (EEI) cable. The first computer CPR1 is connected to the third computer CPR3 with an Ethernet cable. A monitor M3 is attached to the third computer CPR3 and a headset HS3 is attached to the VIC-5 DEOS. If CPR2 and/or CPR3 are to also originate and place calls, CPR2 and/or CPR3 may also run versions of the PBX SW 510B, 510C to facilitate this ability.

Figure 7:
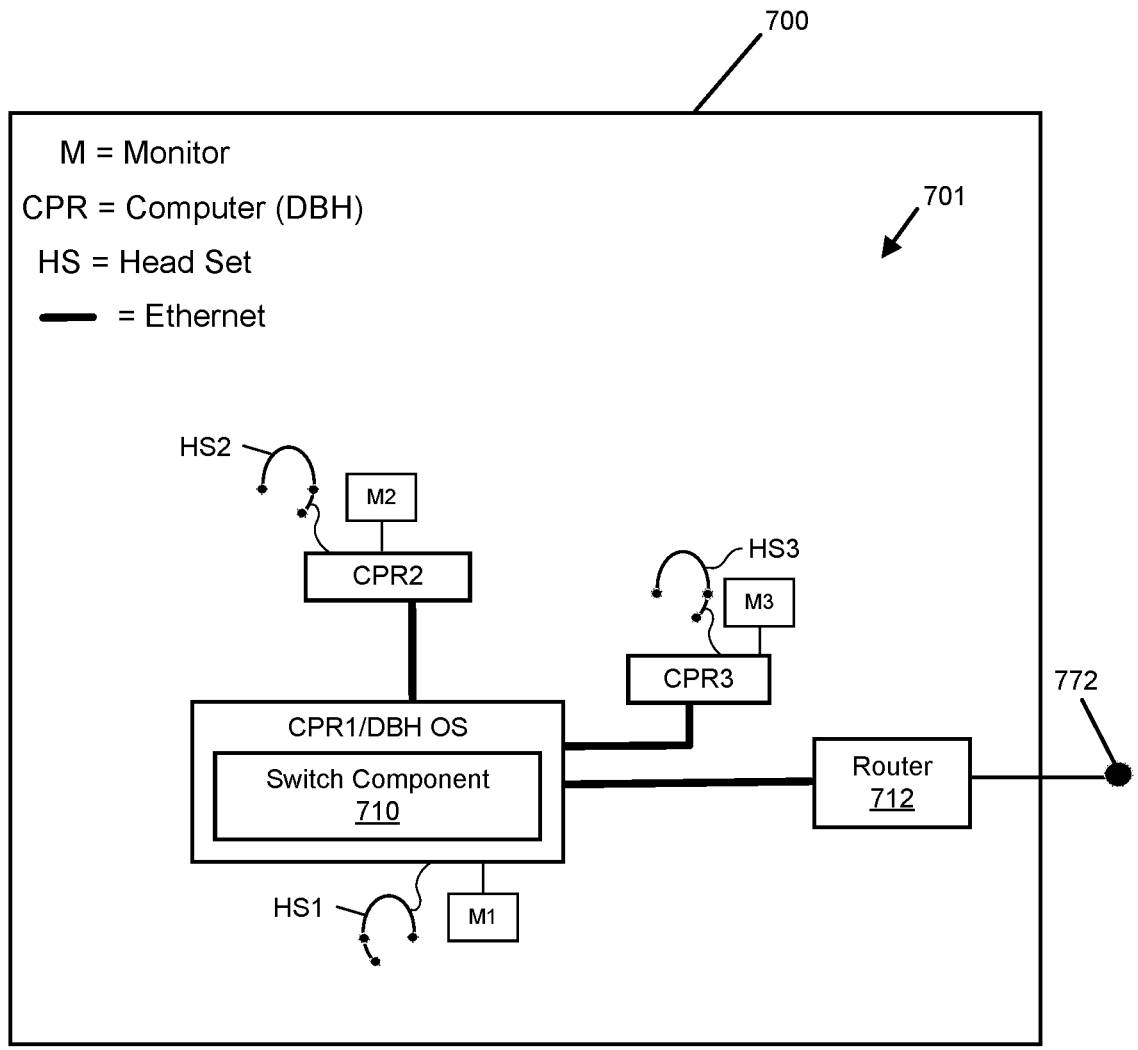
FIG. 7 illustrates a second example environment implementing "Client Variant B".

FIG. 7 illustrates an example embodiment Client Variant B communication system 701 implemented inside a GCV 700. Notice in this figure that the VIC system has been removed (or bypassed). The similar communication system 701 includes first, second, and third computers/DBH operating systems CPR1, CPR2, CPR3 with each computer/operating system connected to corresponding headsets HS1, HS2, HS3 and monitors M1, M2, M3. CPR2 and CPR3 are both connected to CPR1/DBH O/S with Ethernet cables. The CPR1/DBH O/S is connected to a router 712 with an Ethernet cable and the router 712 is connected to an antenna 772 for broadcasting externally to other military vehicles or other external receivers. The first computer CPR1 will execute a SW switch component for times when it is the master switch for routing data packets internally in a GCV. The second and third computers CPR2, CPR3 can also execute a SW switch component for times when one of them is the master switch for routing data packets. Because the Client Variant B system is implemented with digital computers CPR1, CPR2, CPR3 without legacy VIC-5 stations, it may more fully implement the packet based IPv4 protocol or other versions of this protocol. The IPv4 protocol acts as source and destination addresses for the VoIP packets as well as creating one or more IP addressing groups, subgroups, and other features of IPv4 may also be used as understood by those of ordinary skill in the art.

In some embodiments, variant A may implement a session protocol such as Session Initiation Protocol (SIP) protocol and/or the H.323 protocol depending on the chosen hardware and the protocol it supports. Variant B may be custom developed based on one or more of pure Java, Java XMPP signaling, standard Real-Time Protocol (RTP), Secure RTP (SRTP), RTP Control Protocol (RTCP) protocols, ICE, and the like as understood by one of ordinary skill in the art.

Client Variant B's software components, protocols, architecture, and other benefits are now introduced. Swift, Spark, Dino, AstraChat, etc., are examples of XMPP clients and examples of XMPP servers include eJabberd, Tigase, Openfiere, Prosody IM, etc. Client Variant B may be created and compiled as binaries for running on an ARM processor. Client Variant B may enable the DBH to act independently to implement VoIP phone functionality including audio, video and text generally without additional hardware other than speakers, a microphone (MIC), and camera. As previously mentioned, Client Variant B provides support for video web streaming and conferences. Client Variant B provides for a custom API that is capable of interacting with standard external applications based on XMPP signaling (Google Talk and others).

Client variant B and its software with respect to the "Servers" that this variant may utilize when in operation is now discussed. In general, an XMPP client is software or an application that enables connection to XMPP for instant messaging with others over the Internet or a communication system. An XMPP server provides basic messaging, presence, and XML routing features. Jabber/XMPP server software may run an XMPP service, either over the Internet or on a local area network. As a pure Java library, it can be embedded into various applications to create full XMPP clients to simple XMPP integrations such as sending notification messages.

Some embodiments may use XMPP Libraries that are code libraries available for different programming languages that enabling developers to build a variety of XMPP-enabled applications. XMPP clients differ from each other in terms of how they are designed and the capabilities they may serve differ from each other according to the amount of libraries used and the harnessing of the implementations of such libraries. The implementation of XMPP libraries allows for the delivery of modular APIs which differ in design to allow some clients to serve a simple one-to-one messaging, while another implementation could a provide multiuser chat, conferencing or a combination of some or all above. A client can comprise of one or more libraries which are different, and can combine various libraries to provide various services. Other technicalities may differentiate clients such as the network mode of operation by which a client employs to interconnect with other clients.

In one preferred embodiment, a custom design employs a network infrastructure unique to the interface description for ground combat vehicles (GCVs). Compilation for the ARM binaries is currently unique and significant to the design when deployed for an ARM so that Client Variant B may be created and compiled as binaries for running on an ARM processor. Client Variant B is custom developed based on one or more of pure Java, Java XMPP signaling, standard Real-Time Protocol (RTP), Secure RTP (SRTP), RTP Control Protocol (RTCP) protocols, ICE, and the like as understood by one of ordinary skill in the art. Client Variant B may enable the DBH to act independently to implement VoIP phone functionality including audio, video and text generally without additional hardware other than speakers, a microphone (MIC), and camera. As previously mentioned, Client Variant B provides support for Video web streaming and conferences. Client Variant B may also provide for a custom API that is capable of interacting with standard external applications based on XMPP signaling (Google Talk and others).

Figure 8:
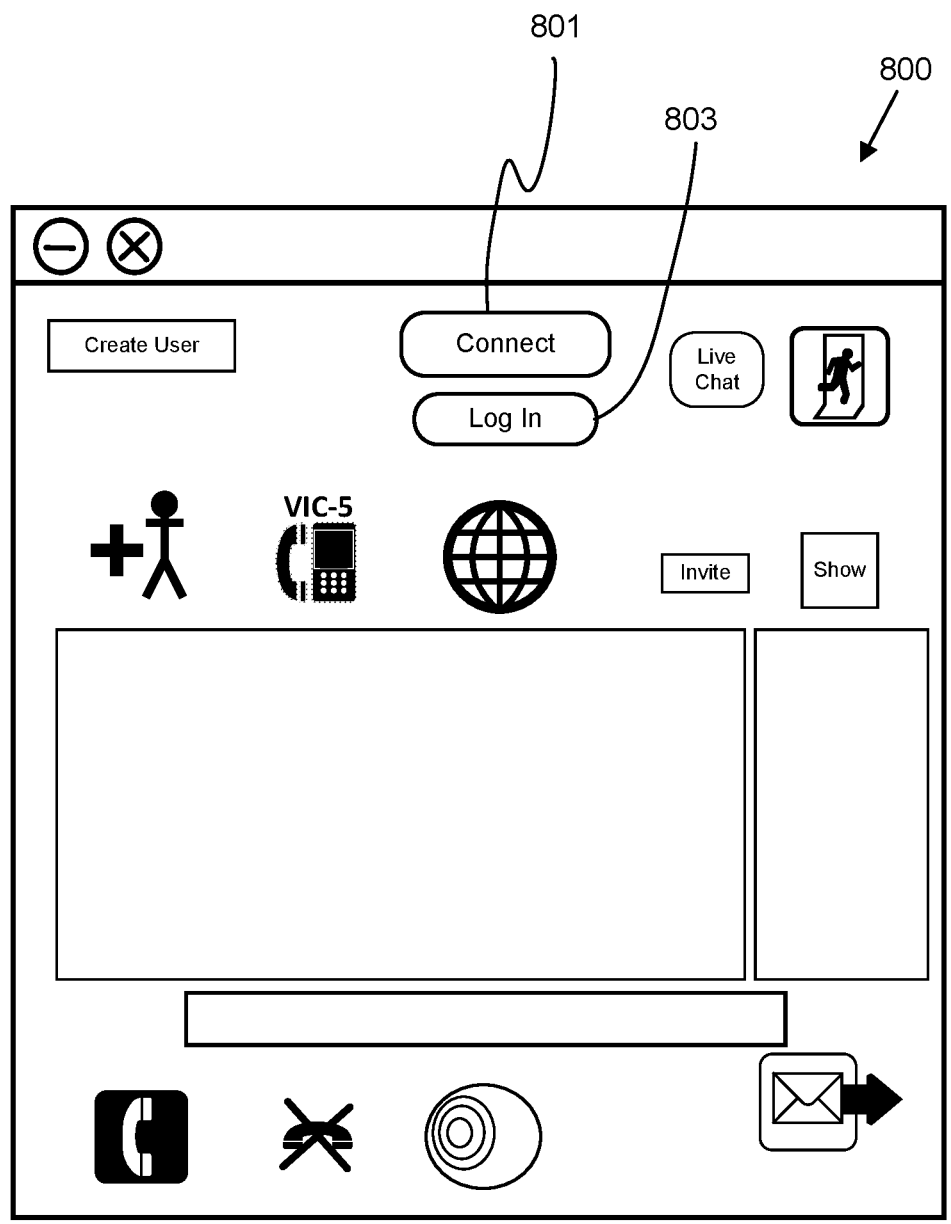
FIG. 8 illustrates an example of a main GUI, generally free of reference numbers, used to select between Variants A and B and to implement some functionality of Variant B.

Having discussed example systems that may communication systems based on Client Variants A and B, example GUIs and methods used to implement Client Variant A and then Variant B are now discussed. One example embodiment may implement a main GUI 800, 900 as illustrated in example FIGS. 8 and 9 that is used to select either a communication system based on Client Variant A or a communication system based on Client Variant B. Client Variant A is now discussed with GUI associated with Client Variant A, and then the GUIs associated with Client Variant B are discussed. Initially, a crew-member may begin logging into Client Variant B by clicking on a "Connect Button" 801 (FIG. 8). Once connected, the crew-member may press the "login button" 803 to log into the system as understood by those of ordinary skill in the art. The connect button 801 and/or a completion of the login process may begin an initialization of included functionalities by connecting application(s) associated with the login to an underlying server. When using Client Variant A, the crew-member may then select the "VIC-5 Button" 902 (FIG. 9) to begin a 1-to-1 digital (VoIP) communication using legacy VIC-5 station(s).

Figure 10:
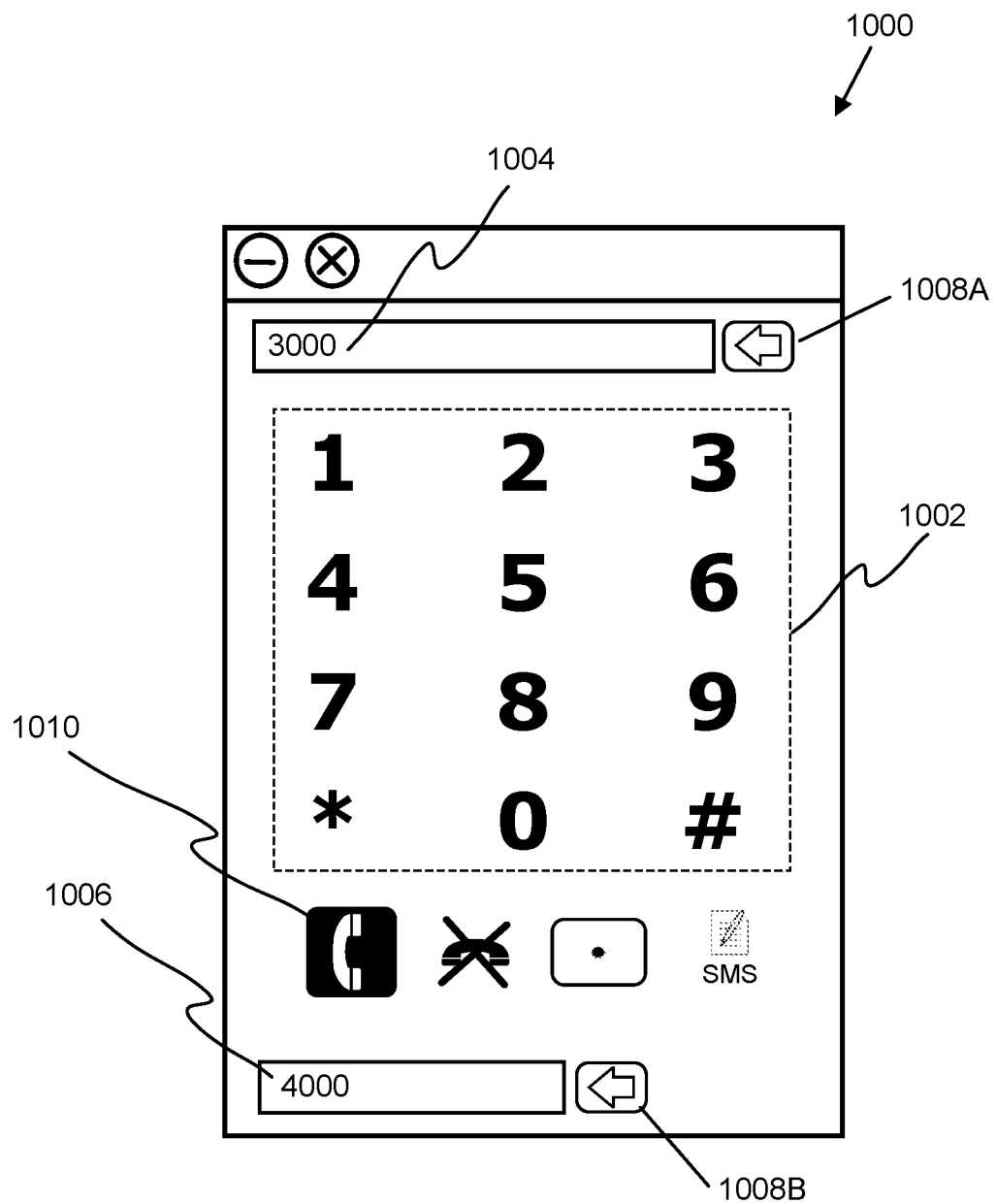
FIG. 10 illustrates an example GUI with a keypad for use with Variant A.

Upon pressing/selecting the VIC-5 Button 902, the system may display the example GUI 1000 illustrated in FIG. 10.

One advantage, over prior VIC-5 systems is that it Client Variant A adds a keypad a keypad 1002 or program keys that would allow for dialing remote extensions, unlike prior VIC-5 systems. Older VIC-5 systems consist of an older analog type of push-to-talk button similar to a traditional radio system. Embodiments with Client Variant A are able to remote the VIC-5 systems allowing for more flexible and extensive use of the VIC's Ethernet expansion interface.

As illustrated in FIG. 10, the crew-member may key in, through the numbered keys 1002, the desired VIC-5 extension number they wish to communicate with. A user extension window 1004 may display a number (here "3000") that is a user extension configured for a user (Caller) that is placing a call. A remote peer VIC-5 extension window 1006 displays the number that the caller crew-member is entering to be called/connect to (callee). Clear buttons 1008A, 1008B may be used to remove digits if a digits is entered in error. The crew-member may press/select a call button 1010 to place the 1-to-1 call. If the call is successful, a call tone beings ringing and a toaster 1102 of GUI 1100 (FIG. 11) is sent to the receiving crew-member. The receiving crew-member may then use the call button 1104 to receive the communications or the end call button 1106 to reject the incoming call or to later terminate communications. In some embodiments, the toaster 1102 of GUI 1100 is displayed when a ring tone is generated. In some configurations, the toaster 1102 and ring tone can time out a call after 20 or so seconds if there is no answer.

In some embodiments, once a call has been placed, behind the scenes Client Variant A via the PBX and Java programming acts as a virtual manager that dials and connects both extensions for a VoIP call session using the VIC-5 hardware as endpoints of the call to and from the caller to the intended recipient, similar to using standard phones. The client parses the information entered (extension keyed into the API/GUI 1000 by the crew-member) into a server. For Client Variant A, this server is a software Asterisk PBX Server which then acts as a gateway similar to how a phone service provider bridges soft protocols and Session Description Protocol (SDP) sessions bi-directional call.

Another added advantage is the interconnection on a wide range of the VIC-5 systems depending on the scalability of the network range configured while in use. In one example scenario, crew-member A described here can either be internal to crew-member B (same vehicle) or they could be in a different GCVs (Ground Combat Vehicle). The example described is just a two way scenario (Variant A) with just two crew-members being connected in communication. However, Client Variant B discussed next allows for multiple crew-members to be connected in communication in a group sessions.

Figure 9:
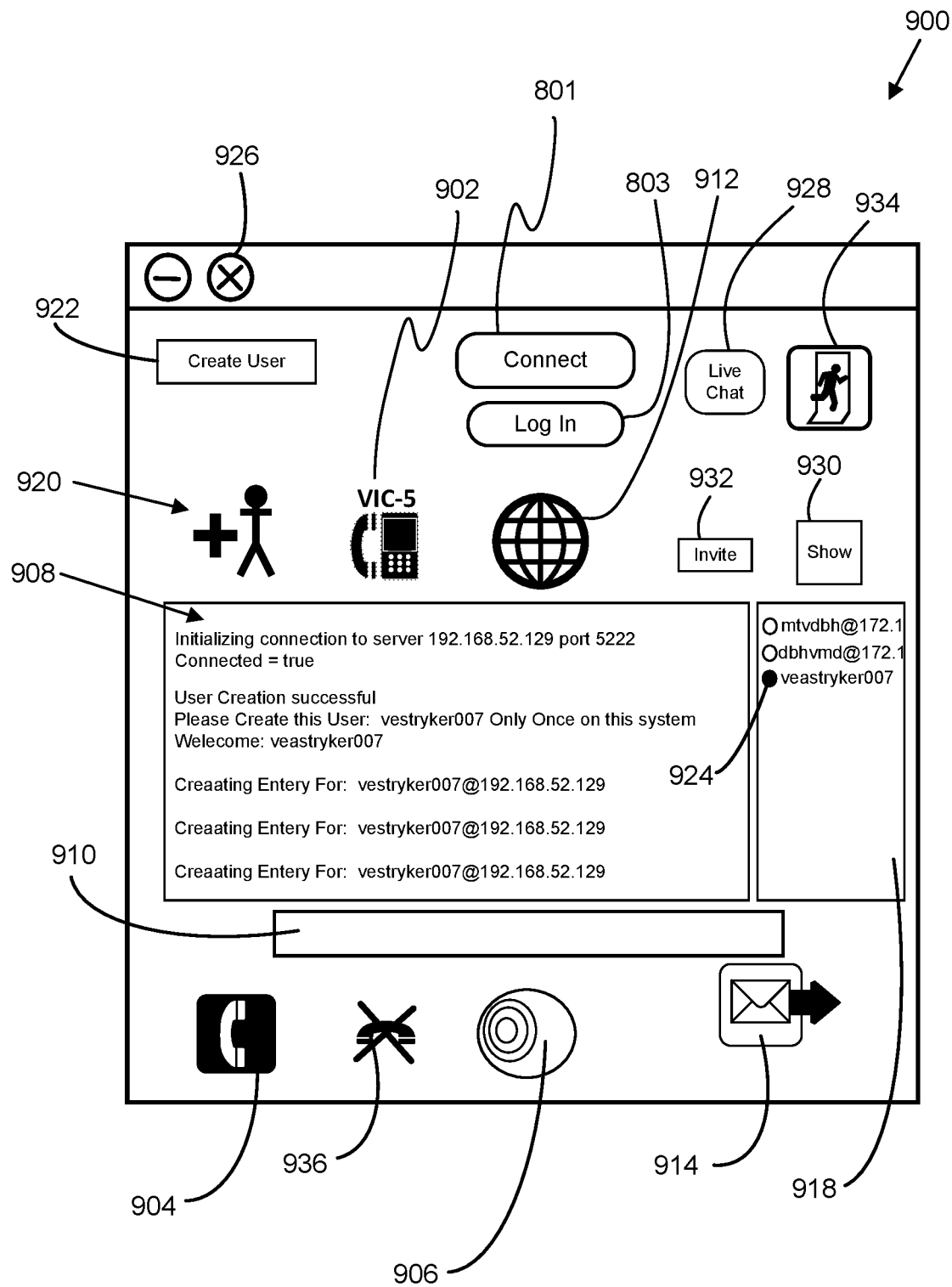
FIG. 9 illustrates an example of a main GUI with reference numbers used to select between Variants A and B and implement some functionality of Variant B.

Client Variant B is now discussed in more detail beginning with reference to the GUI 900 in FIG. 9 and essentially converts the computer/DBH into a robust multimedia server. In one configuration, a crew-member may click on an "online contacts" button 912. This may work by exposing a different set of API in contrast to Variant A. The main API/GUI 900 allows click to connect (with connect button 801) and login (with login button 803) functionality by a crew-member utilizing Integrated Network Enhanced Telemetry (iNET) control protocols for ease of operation by crew members as opposed to entering actual unique user names and passwords which is a standard requirement for the XMPP to be implemented. The GUI 1200 in FIG. 12 starts an automatic discovery of users for intra/inter communication networking.

Figure 12:
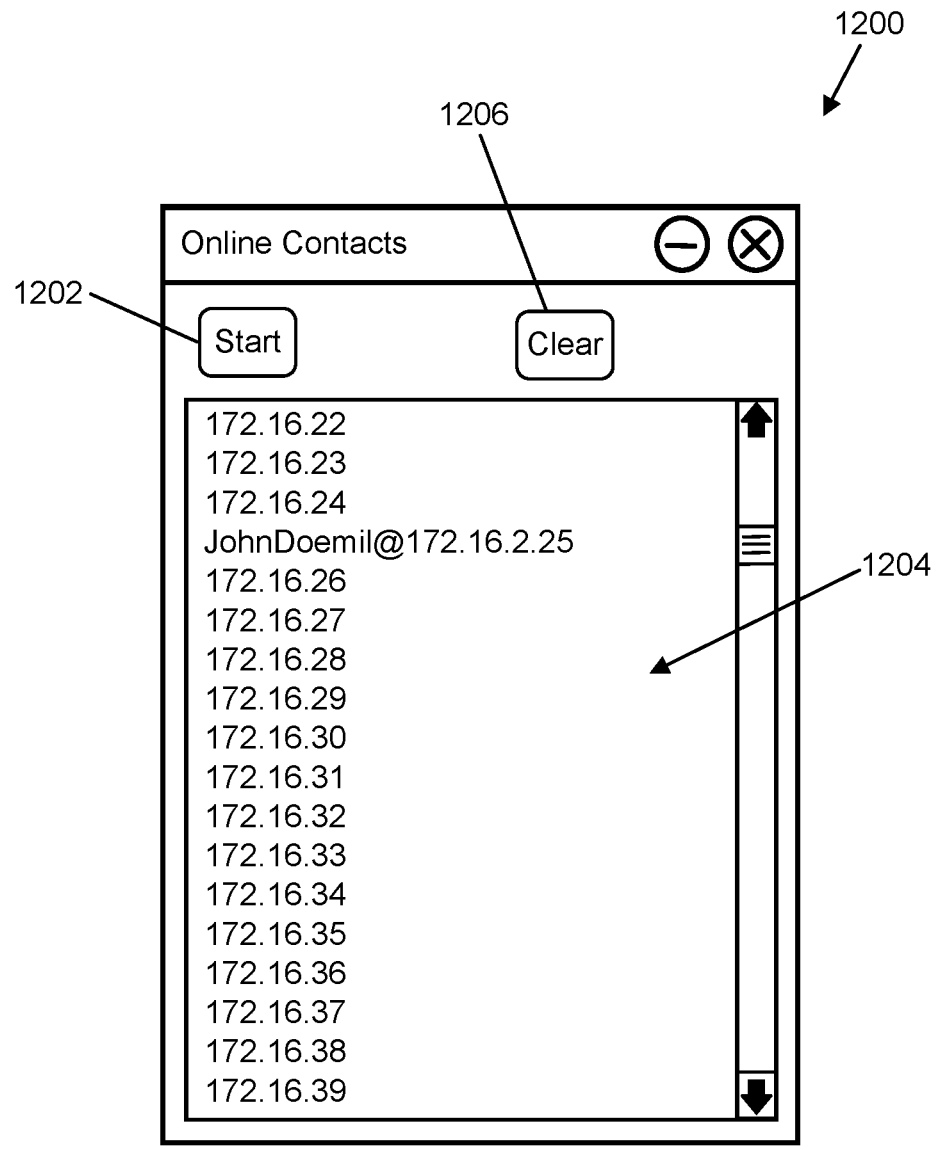
FIG. 12 illustrates an example peer list for use with Variant A and Variant B.

Pressing a "Start" button 1202 on FIG. 12 begins a search processes for determining crew-member names and presence according to the configured hostnames and IP address assigned to each crew-member station. The peer window 1204 displays peers found when the start button 2102 is activated (e.g., pressed). Notice in this example, that one known contact cw1.mil@172.16.2.25 has been found and that was previously a known user. As other known users are discovered, they may be added to the list in the peer window 1204. The "clear" button 1206 may be used to clear the peer window 1104 and a new search may be started by repressing the start button 1202, for example when GCVs may have moved and new GCVs/crew-members may be detected.

Figure 11:
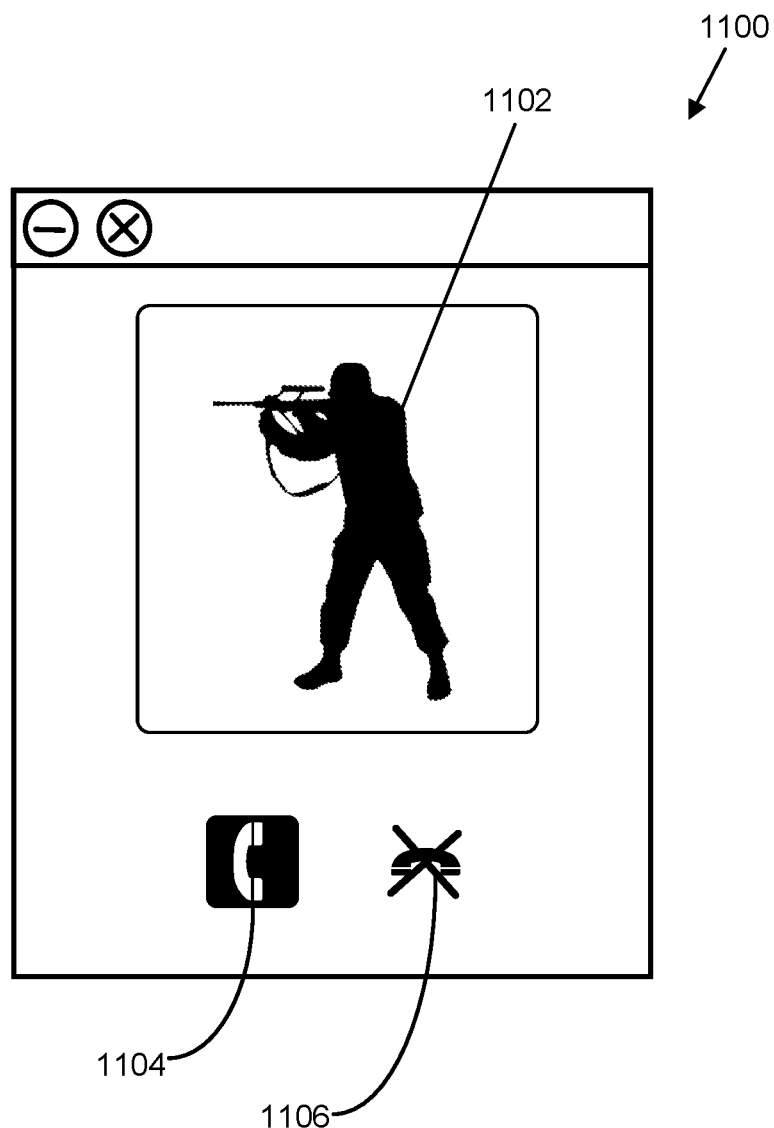
FIG. 11 illustrates an example GUI with a "toaster" for use with Variant A.

This API behind the contacts GUI 1100 of FIG. 11 is suited to the GCV (Ground Combat Vehicles) because it provides a mode of operation that is suitable for GCVs. Other clients using XMPP libraries require significantly more startup input from the end user before messages can be exchanged between endpoints, an example being Skype where one would have to input user names, passwords and the like to have the Skype client connect to the server it is configured for. This embodiment takes into consideration time, environment and ease of access to crew-members providing a click to connect model, but still adhering to the XMPP signaling behind the scenes of the API.

Client Variant B may also employ XEP-0167: Jingle Real-Time Transport Protocol (RTP) Sessions for negotiating one or more sessions that use the RTP to exchange media such as voice or video. The application generally includes a straightforward mapping to Session Description Protocol (SDP) for interworking with SIP media endpoints.

Hardware employed with Variant B employs may be universal serial bus (USB) headset/MICs for voice. There may be conversion to Real-Time Streaming Protocol (RTSP) streams which are video streams that may be provided by existing network cameras on combat vehicles into a Video for Linux 2 (V4L2) compliant stream such as /dev/video0. Thus, a pure RSTP stream may not be compliant with basic RTP/SDP media sessions for transmitting video in standard XMPP applications. Therefore, a conversion of those video streams via a Linux kernel module known as "V4L2 loop back" is performed. That stream is fed into the virtual video driver to be available for a WebRTC video session provided by the server employed and is embedded within a chromium webpage in app mode for its display.

The API (GUI 800, FIG. 9) consists of a call button 904 for placing a call through the Jingle protocol described, and also a video button 906 for placing a video call into a conference room with other interconnected GCVs. The call button 904 places the call to the selected peer under the peer column 918 of the contacts. If the call is successful, a call tone beings ringing and a toaster 1102 of GUI 1100 (FIG. 11) is sent to the receiving crew-member. The receiving crew-member may then use the call button 1104 to receive the communications and the end call button 1106 to reject the incoming call or to later terminate communications. In some embodiments, the toaster 1102 of GUI 1100 is displayed when a ring tone is generated, the toaster 1102 and ring tone can time out a call after 20 or so seconds if there is no answer.

In another embodiment of Client Variant B, a crew-member may search multiple subnets and find other vehicles within the connected or guided network boundaries allowed for the GCV in deployment. In one embodiment, a GUI 1200 (FIG. 12) is used that may use a single click of a start button 1202 to search for online contacts, once found they are listed, then a crew-member can just click on the desired contacts found and automatically add them into a peer list/roster to enable communication with the contacts in all the ways mentioned previously. Hence the client in Variant B mode is able to allow for messaging, one-to-one private messages, multi-user chat, and video conferencing.

Client Variants B may also be compiled and reduced to a binary code that is executable on an Advanced Reduced Instruction Set Computer (RISC) machine (ARM).

The main GUI/API 900 of FIG. 9 may have other useful features. For example, a text area 908 may be a space where messages are received from connected contacts as well as a copy of a crew-member's sent messages. A message input area 910 may be a space where messages may be typed. Upon pressing the message send button 914, those messages are moved into the text area 908 for the crew-member's copy and sent it to the intended recipient. In one configuration, if no peer name is selected inside of peer column 918, the message is sent to any connected conference. Else, if a peer is selected under the peer column, the message is only sent to the peer selected as a private one-to-one message. The video conference button 906 initiates a video conference, If no peer name is selected inside of the peer column, it starts a self-hosted video conference, else, if a peer is selected under the peer column, then it joins the conference with that selected peer.

Other useful features may be included such as an add peer button 920 which may be selected to add a peer under the peer names column 918. The create user button 922 may be useful for first time use of the application/GUI 900 for creating a user. This may allow a crew-member/user to create a peer afterward that peer may be automatically created. A presence Icon 924 may become green when users are online, and transparent when users are offline. A close application symbol 926 may close this application, and any other interfaces open (i.e., FIGS. 10-12). A live chat button 928 may be used to create/open a live chat session, a show button 930 may be used to show all peers, an invite button 932 may be used to invite a peer to a communication session, a leave room button 934 may be used to leave a communication session, and an end call button 936 may be used to end all communications.

Figure 13:
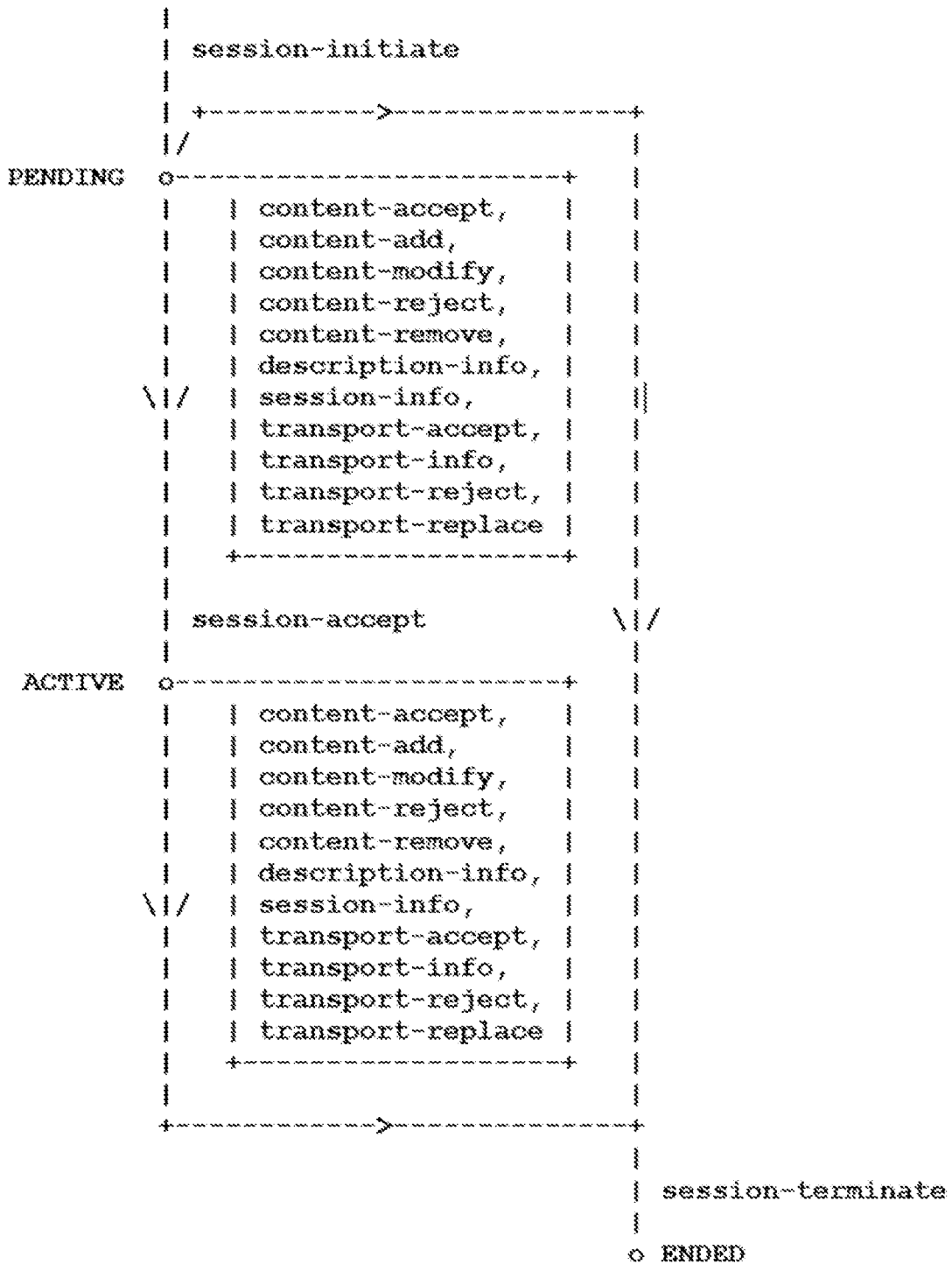
FIG. 13 illustrates an example XEP-0166 Jingle diagram protocol description.
Figure 14:
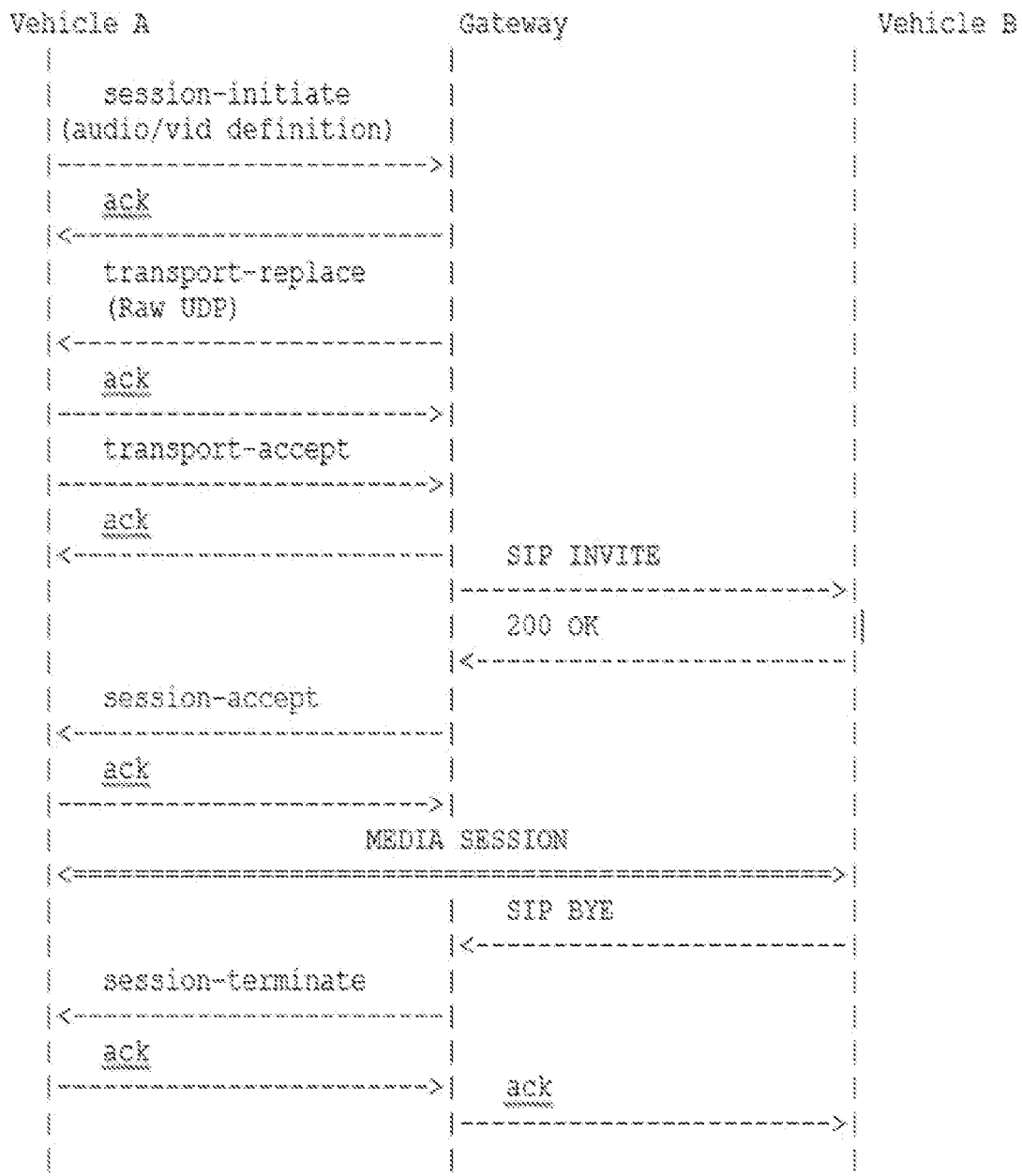
FIG. 14 illustrates an example XEP-0176 Jingle ICE-UDP diagram protocol description transport method.
Figure 16:
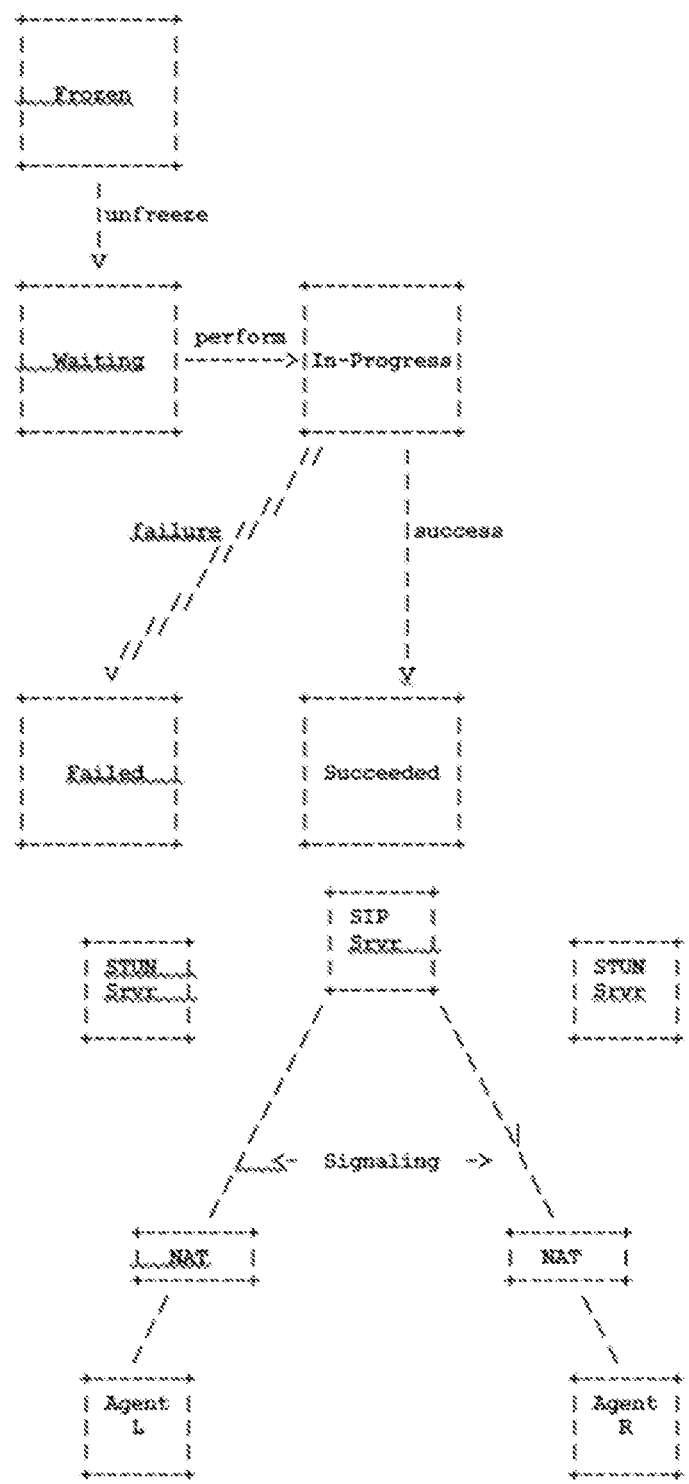
FIG. 16 illustrates an example of an Interactive Connectivity Establishment (ICE) protocol for Network Address Translator (NAT) traversal for offer/answer Protocols.

FIGS. 13-17 illustrate example embodiments of various protocols and standards that may be implemented in the above embodiments. FIG. 13 illustrates an example, XEP-0166 Jingle Diagram Protocol Description. FIG. 14 illustrates an example XEP-0176 Jingle ICE-UDP Diagram Protocol Description Transport Method. FIG. 15 illustrates an example embodiment of another XEP-0176 Jingle ICE-UDP Diagram Protocol Description Transport Method. FIG. 16 illustrates an example Interactive Connectivity Establishment (ICE) protocol for Network Address Translator (NAT) traversal for offer/answer Protocols. FIG. 17 illustrates example open source libraries and licenses such as the Apache License 2.0.

Portions of some embodiments may be implemented using, for example, the Interactive Connectivity Establishment (ICE) Deployment Scenario and the following is an example SDP message that includes ICE attributes:

```
v=0
o=cw1 2890844526 2890842807 IN IP4 10.0.1.10
s=
c=IN IP4 192.0.2.3
t=0 0
a=ice-pwd:asd88fgpdd777uzjYhagZg
a=ice-ufrag:8hhY
m=audio 45664 RTP/AVP 0
b=RS:0
b=RR:0
a=rtpmap:0 PCMU/8000
a=candidate:1 1 UDP 2130706431 10.0.1.10 8998 typ host
a=candidate:2 1 UDP 1694498815 192.0.2.3 45664 typ srflx raddr
   10.0.1.1 rport 8998
```

In summary, the embodiments herein provide several benefits for ground combat vehicles and other similar vehicles. The example embodiments provide for open source technology that may be proprietary to the department of defense (DOD) if. The embodiments described herein operate with custom military equipment, and does not rely on external service providers (e.g. Central domain servers) to weave a communication web amongst vehicles for inter and intra vehicle communication. It takes account into consideration defense target systems, environment of operations, and mode of deployment of communication infrastructure unique to the defense industry and wraps various embodiments around those objectives and goals.

Additionally, the above embodiments are implemented to provide other benefits to the armored vehicle warfighter. For example, some of the above embodiments provide for more effective and situational awareness on multiple COMM channels (Video/Text/Audio) during combat mission operations. Various embodiments may not be overly dependent on existing hardware infrastructure for communications on vehicle systems as the described embodiments are external COMM hardware independent. Additionally, the example embodiments may provide a more effective size, weight, power and cost (SWAP-C) for mission needs on combat vehicle.

Methods that can be implemented in accordance with the disclosed subject matter, may be at least partially implemented with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that in some embodiments the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 18:
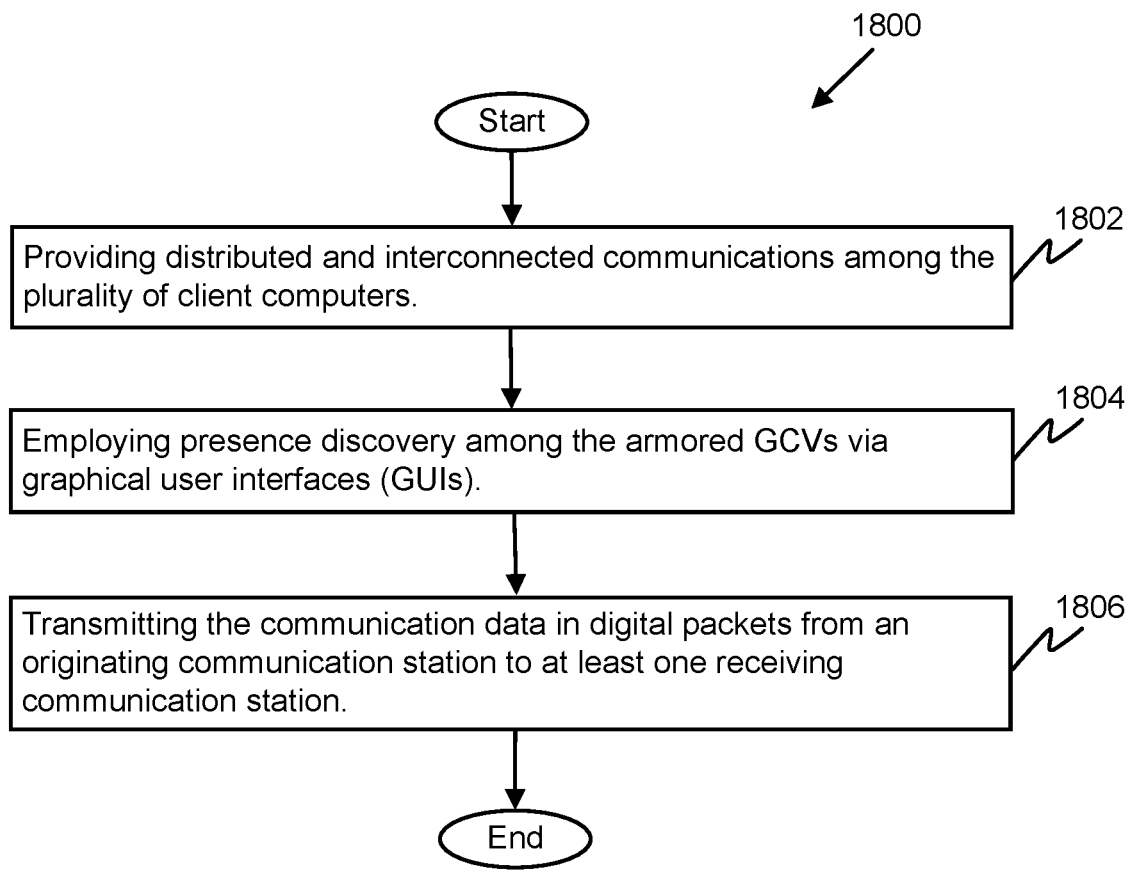
FIG. 18 illustrates an example view of a method of communication within and between armored GCVs.

A method 1800 (FIG. 18) of communicating over a communication system among a plurality of client computer in armored ground combat vehicles (GCVs). The method provides, at 1802, distributed and interconnected communications among the plurality of client computers. Logic providing the distributed and interconnected communications is not located at a single client computer. The method 1800 also employs, at 1804, presence discovery among the armored GCVs via graphical user interfaces (GUIs). The communication data is transmitted, at 1806, in digital packets from an originating communication station to at least one receiving communication station. The transmitting may include transmitting the communication data from a first armored ground combat vehicle (GCV) to a second different GCV. The communication data is transmitted to at least one of the groups consisting of: a one-to-one communication, a text communication to a group, an audio communication to a group, and a video communication to a group.

Thus, various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims. Accordingly, the disclosure is intended to embrace all such alterations, modifications, and variations that fall within the scope of this application, including the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Additionally, references to "the preferred embodiment", "an embodiment", "one example", "an example" and the like, are not to be construed as preferred or advantageous over other embodiments or designs. Rather, use of the words "the preferred embodiment", "an embodiment", "one example", "an example" and the like are intended to present concepts in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A communication system within an armored ground combat vehicle (GCV), the communication system comprising:
    an analog communication station within the GCV configured as a push-to-talk analog communication station, the analog communication station having an input configured to input an audio input, an output configured to output an audio output, and an actuatable button to toggle between (1) a communication transmission mode, wherein the input inputs the audio input, and (2) a communication reception mode, wherein the output outputs the audio output, wherein the analog communication station is configured to, in response to the button being actuated, generate an analog audio signal from the audio input as analog communication data;
    a first computer having a display, the first computer operatively connected to the analog communication station; and
    a server operatively connected to the first computer, wherein
    the first computer is configured to
        implement a Session Initiation Protocol (SIP) and a Voice over Internet Protocol (VoIP) to digitize analog communication data from the analog communication station to digital communication data for further transmission,
        display a selection graphical user interface (GUI) on the display, wherein the selection GUI is configured to receive a selected communication station as a first input selection, the selected communication station being another communication station to which the digital communication data is routed for reception, and
        transmit the digital communication data to the server for further transmission, and wherein
    the server is configured to
        implement a private branch exchange (PBX) application to switch and route the digital communication data over a wired and/or wireless network to the selected communication station for reception, and wherein
    the first computer is further configured to display a keypad GUI on the display, and wherein
    the keypad GUI is configured to accept a number that is associated with the selected communication station for dialing the selected communication station as a second input selection, and wherein
    the selection GUI comprises a plurality of communication selectors each indicative of an available communication mode between the analog communication station and the selected communication station, and wherein
    a first communication selector of the plurality of communication selectors is indicative of one-to-one communication between the analog communication station and the selected communication station.

2. The communication system of claim 1, wherein the selection GUI further comprises a station list GUI that displays available communication stations that are available for communication with the analog communication station.

3. The communication system of claim 1, wherein the server is further configured to transmit the digital communication data within VoIP data packets.

4. The communication system of claim 3, wherein the first computer is a 672 Digital Beachhead computer and operating system.

5. The communication system of claim 1, wherein the analog communication station is a vehicular intercom system-5 (VIC-5) station.

6. The communication system of claim 1, wherein the PBX application is Asterisk PBX.

7. The communication system of claim 1, wherein the PBX application is open source PBX.

8. The communication system of claim 1, wherein the selection GUI is further configured to receive login data as a third input selection.

9. The communication system of claim 1, wherein, in response to the first communication selector being selected, the first computer displays the keypad GUI on the display.

10. The communication system of claim 9, wherein a second communication selector of the plurality of communication selectors is indicative of multimedia communication with the selected communication station.

11. The communication system of claim 10, further comprising logic configured to provide distributed and interconnected multimedia communications among a plurality of client computers within the GCV.

12. The communication system of claim 1, wherein the selected communication station is another analog communication station located within the same GCV.

13. The communication system of claim 1, wherein the selected communication station is in a second GCV.

14. The communication system of claim 13, further comprising a router to route the digital communication data between the GCV and the second GCV.

15. The communication system of claim 13, wherein the GCV is one of a plurality of GCVs defining a plurality of nodes of a wireless mobile ad hoc network.

16. The communication system of claim 1, wherein the analog communication station includes a headset port configured to mechanically and electrically couple a headset to the analog communication station, and wherein the headset is the input and the output of the communication station.

17. The communication system of claim 1, wherein the first computer is further configured to display a toaster GUI indicative of a new incoming communication from another communication station on the display, and wherein
    in response to a new incoming communication being sent to the analog communication station for reception by the analog communication station, the computer displays the toaster GUI on the display.

18. The communication system of claim 1, wherein the analog communication station includes an Ethernet network interface (ENI) and the analog communication station is further configured to connect to the first computer via the ENI.

* * * * *